United States Patent
Kim et al.

(10) Patent No.: US 12,325,282 B2
(45) Date of Patent: Jun. 10, 2025

(54) THERMAL MANAGEMENT SYSTEM FOR VEHICLE

(71) Applicants: Hyundai Motor Company, Seoul (KR); Kia Corporation, Seoul (KR)

(72) Inventors: Jong Won Kim, Cheonan-si (KR); Sang Shin Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 160 days.

(21) Appl. No.: 18/454,418

(22) Filed: Aug. 23, 2023

(65) Prior Publication Data
US 2024/0326558 A1 Oct. 3, 2024

(30) Foreign Application Priority Data
Mar. 28, 2023 (KR) .......... 10-2023-0040158

(51) Int. Cl.
*B60H 1/00* (2006.01)
(52) U.S. Cl.
CPC .............. *B60H 1/00914* (2013.01)
(58) Field of Classification Search
CPC .. B60H 1/00914; B60H 1/323; B60H 1/3211; B60H 2001/002; F25B 41/20
See application file for complete search history.

(56) References Cited

U.S. PATENT DOCUMENTS

| | | | | |
|---|---|---|---|---|
| 5,408,841 A | * | 4/1995 | Fujiwara | B60H 1/3225 62/197 |
| 5,899,086 A | * | 5/1999 | Noda | B60H 1/323 62/238.7 |
| 2017/0313158 A1 | * | 11/2017 | Porras | H01M 10/63 |
| 2022/0324296 A1 | * | 10/2022 | Schroeder | B60H 1/00807 |

\* cited by examiner

*Primary Examiner* — Marc E Norman
(74) *Attorney, Agent, or Firm* — Slater Matsil, LLP

(57) ABSTRACT

An embodiment thermal management system for a vehicle includes a compressor on a first refrigerant line that compresses a refrigerant circulated therein, an external condenser on the first refrigerant line downstream of the compressor that releases heat of the refrigerant, a front evaporator on the first refrigerant line downstream of the external condenser that evaporates the refrigerant, a second refrigerant line connected to the first refrigerant line that allows the refrigerant to be introduced thereinto and then to be discharged upstream of the compressor, a rear evaporator on the second refrigerant line that selectively releases heat of the refrigerant, a first flow control valve on the first refrigerant line that allows the refrigerant to be introduced into the rear evaporator or the external condenser, and a second flow control valve on the second refrigerant line that allows the refrigerant to be introduced into the compressor or the external condenser.

16 Claims, 3 Drawing Sheets

THERMAL MANAGEMENT SYSTEM FOR VEHICLE

CROSS-REFERENCE TO RELATED APPLICATIONS

This application claims the benefit of Korean Patent Application No. 10-2023-0040158, filed on Mar. 28, 2023, which application is hereby incorporated herein by reference.

TECHNICAL FIELD

The present disclosure relates to a vehicle thermal management system.

BACKGROUND

Generally, an air conditioning system of a vehicle serves to maintain the temperature inside the vehicle at an appropriate level regardless of external temperature changes and to control the temperature inside the vehicle through compression, condensation, expansion, and evaporation of a refrigerant.

In a conventional air conditioning system, refrigerant discharged from a compressor circulates back to the compressor through a condenser, an expansion valve, and an evaporator, and in this course, heat exchange is performed by an evaporator so as to cool air that is introduced into the interior of the vehicle.

The conventional air conditioning system includes a front air conditioner for temperature control of a front seat space of the vehicle and a rear air conditioner for temperature control of a rear seat space of the vehicle and utilizes a single electric compressor to compress and circulate a refrigerant.

Generally, in the conventional air conditioning system, the rear air conditioner is not operated when no passenger is in the rear seat. For this reason, the rear air conditioner has a lower frequency of use than the front air conditioner, which is configured to control temperature of the front seat space including a driver's seat.

Meanwhile, in the case of a vehicle for transporting goods with only a driver on board in general, the rear air conditioner is rarely used, and mainly, the front air conditioner is solely used. A small electric commercial vehicle such as a van is mainly used for transporting goods and there is always demand for an increase in range for transporting goods.

For this reason, a method for increasing the range of a vehicle by utilizing a rear air conditioner of an air conditioning system is needed.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a vehicle thermal management system. Particular embodiments relate to a vehicle thermal management system capable of reducing power consumption of a compressor on a refrigerant line so as to increase fuel efficiency of the vehicle.

Embodiments of the present invention can solve problems associated with the prior art, and an embodiment of the present invention provides a vehicle thermal management system that utilizes a rear evaporator to reduce the load of an external condenser, thereby reducing power consumption of a compressor on a refrigerant line and increasing fuel efficiency of the vehicle.

The embodiments of the present invention are not limited to the above-mentioned embodiment, and other embodiments not mentioned will be clearly understood by those of ordinary skill in the art to which embodiments of the present invention pertain by the description below.

An embodiment of the present invention provides a vehicle thermal management system including an electric compressor provided on a first refrigerant line and configured to compress a refrigerant circulated in the first refrigerant line, an external condenser provided on the first refrigerant line, connected downstream of the compressor, and configured to release heat of a refrigerant discharged from the compressor through heat exchange with air, a front evaporator provided on the first refrigerant line, connected downstream of the external condenser, and configured to evaporate a refrigerant through heat exchange with air, a second refrigerant line connected to the first refrigerant line and configured to allow a refrigerant discharged from the external condenser to be introduced thereinto and then to be discharged upstream of the compressor, a rear evaporator provided on the second refrigerant line and configured to selectively release heat of the refrigerant through heat exchange with air, a first flow control valve provided on the first refrigerant line and configured to allow a refrigerant discharged from the compressor to be introduced into one of the rear evaporator and the external condenser, and a second flow control valve provided on the second refrigerant line and configured to allow a refrigerant discharged from the rear evaporator to be introduced into one of the compressor and the external condenser.

In an embodiment, the first flow control valve may be disposed downstream of the compressor and may be connected upstream of the rear evaporator via a third refrigerant line.

In another embodiment, the second flow control valve may be disposed downstream of the rear evaporator and may be connected upstream of the external condenser via a fourth refrigerant line.

In still another embodiment, when the first flow control valve opens the third refrigerant line, the refrigerant discharged from the compressor may be introduced into the rear evaporator via the third refrigerant line.

In yet another embodiment, when the first flow control valve opens the third refrigerant line, the second flow control valve may open the fourth refrigerant line.

In still yet another embodiment, when the second flow control valve opens the fourth refrigerant line, the refrigerant discharged from the rear evaporator may be introduced into the external condenser via the fourth refrigerant line.

In a further embodiment, when the first flow control valve opens the third refrigerant line, flow of the refrigerant from the compressor to the external condenser may be blocked.

In another further embodiment, when the second flow control valve opens the fourth refrigerant line, flow of the refrigerant from the rear evaporator to the compressor may be blocked.

In still another further embodiment, when the refrigerant discharged from the compressor is introduced into the rear evaporator via the third refrigerant line, the rear evaporator may release the heat of the refrigerant through heat exchange with air.

In yet another further embodiment, when the first flow control valve closes the third refrigerant line, the refrigerant discharged from the compressor may be introduced into the external condenser via the first refrigerant line.

In still yet another further embodiment, when the first flow control valve closes the third refrigerant line, the second flow control valve may close the fourth refrigerant line.

In a still further embodiment, when the second flow control valve closes the fourth refrigerant line, the refrigerant discharged from the rear evaporator may be introduced into the compressor via the second refrigerant line.

In still another further embodiment, the second refrigerant line may be provided with an expansion valve disposed upstream of the rear evaporator.

In a yet still further embodiment, when the first flow control valve opens the third refrigerant line, the expansion valve may be controlled in a closed mode.

In yet another still further embodiment, when the first flow control valve closes the third refrigerant line, the expansion valve may be controlled in an open mode.

In yet another still further embodiment, when the expansion valve is controlled in the open mode and the refrigerant from which heat is released in the external condenser is introduced into the rear evaporator, the rear evaporator may evaporate the refrigerant through heat exchange with air.

Other aspects of embodiments of the invention are discussed infra.

It is to be understood that the term "vehicle" or "vehicular" or other similar terms as used herein are inclusive of motor vehicles in general, such as passenger automobiles including sport utility vehicles (SUVs), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of embodiments of the present invention, and wherein.

It should be understood that the appended drawings are not necessarily to scale, presenting a somewhat simplified representation of various features illustrative of the basic principles of embodiments of the invention. The specific design features of embodiments of the present invention as disclosed herein, including, for example, specific dimensions, orientations, locations, and shapes, will be determined in part by the particular intended application and usage environment.

In the figures, the reference numbers refer to the same or equivalent parts of embodiments of the present invention throughout the several figures of the drawings.

DETAILED DESCRIPTION OF ILLUSTRATIVE EMBODIMENTS

Hereinafter, embodiments of the present invention will be described with reference to the accompanying drawings. The matters described in the attached drawings may be different from those actually implemented in order to facilitate description of the embodiments of the present invention.

In addition, in this specification, terms such as "first" and "second" may be used to describe various components, but the components are not limited to the terms. These terms are used to distinguish one component from another. For example, without departing from the scope of embodiments of the present invention, a first component may be referred to as a second component, and a second component may be referred to as a first component.

Figure 1:
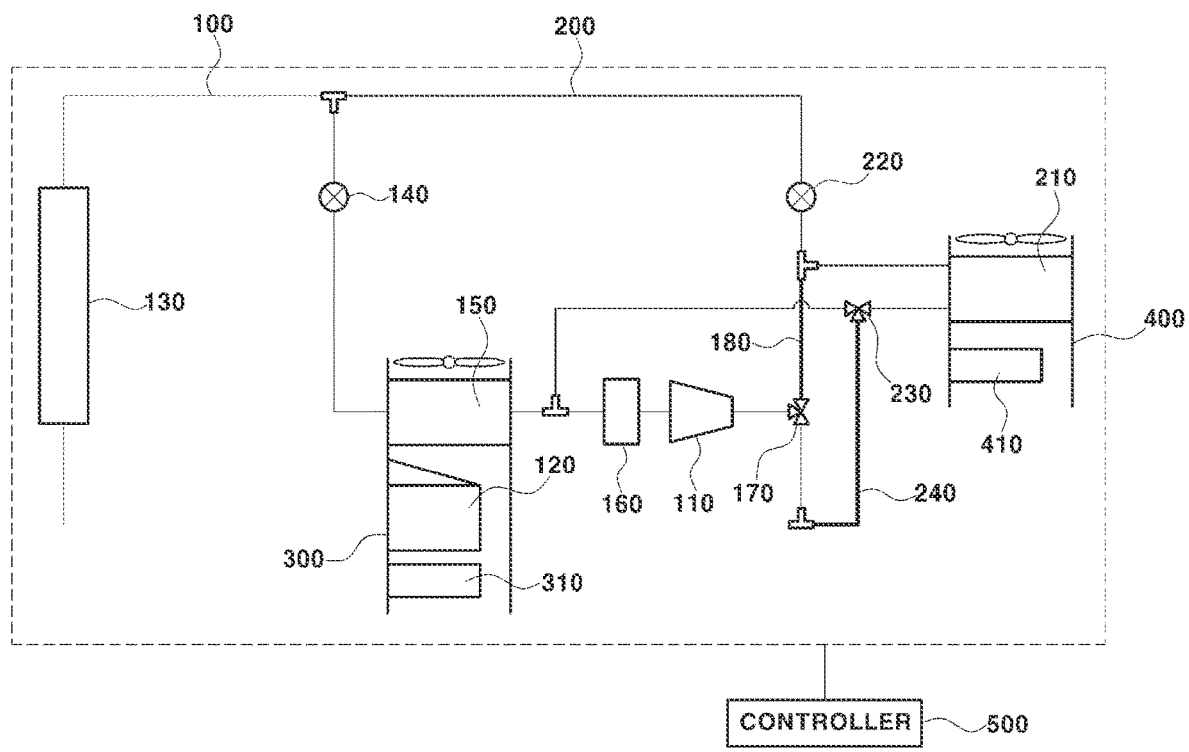
FIG. 1 is a view illustrating a vehicle thermal management system according to an embodiment of the present invention.

As illustrated in FIG. 1, a vehicle thermal management system according to an embodiment of the present invention includes a first refrigerant line 100 configured to interconnect an electric compressor 110, an external condenser 130, and a front evaporator 150 so as to allow a refrigerant to circulate therethrough, and a second refrigerant line 200 configured to connect a rear evaporator 210 to the first refrigerant line 100 so as to allow the refrigerant to circulate therethrough.

The electric compressor 110 is provided on the first refrigerant line 100 and is configured to compress the refrigerant circulating in the first refrigerant line 100. The electric compressor 110 compresses a low-temperature and low-pressure gaseous refrigerant introduced therein into a high-temperature and high-pressure gaseous refrigerant and then discharges the same.

The external condenser 130 is provided on the first refrigerant line 100 and is connected downstream of the compressor 110. The compressor 110 and the external condenser 130 have an internal condenser 120 disposed therebetween. The external condenser 130 is disposed downstream of the internal condenser 120 on the first refrigerant line 100.

The internal condenser 120 is configured to heat air sent to the interior of the vehicle when the front air conditioner 300 is operated in a heating mode. In the heating mode, the internal condenser 120 heats the air through heat exchange with the refrigerant. The internal condenser 120 allows the refrigerant to pass therethrough without causing the refrigerant to release heat when the front air conditioner 300 is operated in a cooling mode.

The refrigerant discharged from the compressor 110 passes through the internal condenser 120 and then is introduced into the external condenser 130. The external condenser 130 is a component configured to condense the refrigerant through heat exchange with outside air when the front air conditioner 300 is operated in the cooling mode. The external condenser 130 may condense the gaseous refrigerant introduced thereinto from the compressor 110 into a liquid refrigerant and then discharge the same. The gaseous refrigerant introduced into the external condenser 130 is condensed into a liquid refrigerant without a change in temperature.

The external condenser 130 has a first expansion valve 140 disposed downstream thereof. The first expansion valve 140 is disposed between the external condenser 130 and the front evaporator 150. The first expansion valve 140 is a component configured to reduce the pressure of the liquid refrigerant discharged from the external condenser 130 so as to expand the same in volume. The first expansion valve 140 may discharge the low-temperature and low-pressure liquid refrigerant, which is reduced in pressure and expanded in volume, to the front evaporator 150.

The front evaporator 150 is a component configured to cool the air supplied to the front seat space in the vehicle. The front evaporator 150 is provided on the first refrigerant line 100 and connected downstream of the external condenser 130. The front evaporator 150 may cool the air supplied to the front seat space in the vehicle through heat exchange with the refrigerant. In other words, the front evaporator 150 may evaporate the low-temperature and low-pressure liquid refrigerant discharged from the first expansion valve 140 through heat exchange with air.

The low-temperature and low-pressure gaseous refrigerant discharged from the front evaporator 150 passes through an accumulator 160 and then is introduced into the compressor 110. The accumulator 160 is a component configured to prevent liquid refrigerant from being introduced into the compressor 110. The accumulator 160 is disposed upstream of the compressor 110 and is configured to discharge only the gaseous refrigerant, among the refrigerants introduced thereinto from the front evaporator 150, to the compressor 110. The liquid refrigerant among the refrigerants discharged from the front evaporator 150 is stored in the accumulator 160.

The front air conditioner 300 includes the front evaporator 150 and the internal condenser 120. The front evaporator 150 and the internal condenser 120 have passages for the flow of refrigerant. Reference numeral 310 denotes a positive temperature coefficient (PTC) heater 310 provided on the front air conditioner 300.

The second refrigerant line 200 is an open-loop refrigerant line and is connected to the first refrigerant line 100, having a closed loop structure, so as to allow a refrigerant to flow therethrough. Specifically, the second refrigerant line 200 is connected to the first refrigerant line 100 so that the refrigerant discharged from the external condenser 130 may flow in and then be discharged upstream of the compressor 110.

As illustrated in FIG. 1, the second refrigerant line 200 has one end in the refrigerant flow direction connected to the rear end of the external condenser 130 (i.e., refrigerant outlet) and has another end in the refrigerant flow direction connected to the front end of the accumulator 160 (i.e., refrigerant inlet). In other words, the second refrigerant line 200 has the one end connected downstream of the external condenser 130 and upstream of the first expansion valve 140 and has the other end connected downstream of the front evaporator 150 and upstream of the accumulator 160.

The second refrigerant line 200 is provided with the rear evaporator 210 and the second expansion valve 220. The rear evaporator 210 and the second expansion valve 220 are interconnected via the second refrigerant line 200 so as to allow refrigerant to flow therethrough.

The second expansion valve 220 is disposed upstream of the rear evaporator 210 on the second refrigerant line 200. In other words, the second expansion valve 220 is disposed upstream of the rear evaporator 210 with respect to the refrigerant flow direction when a rear air conditioner 400 is operated in the cooling mode.

When the rear air conditioner 400 is operated in the cooling mode, the rear evaporator 210 performs heat exchange in a refrigerant heat absorbing mode. Here, the rear evaporator 210 receives the liquid refrigerant discharged from the external condenser 130 through the second expansion valve 220.

In addition, when the front air conditioner 300 is operated in the cooling mode but the rear air conditioner 400 is not operated in the cooling mode, the rear evaporator 210 performs heat exchange in a refrigerant heat releasing mode. Here, the rear evaporator 210 is directly supplied with the gaseous refrigerant discharged from the compressor 110.

In embodiments of the present invention, when the rear air conditioner 400 is operated in the cooling mode, the rear evaporator 210 receives the refrigerant discharged from the external condenser 130, and when the rear air conditioner 400 is not operated in the cooling mode, the rear evaporator 210 receives the refrigerant discharged from the compressor 110. In other words, refrigerant discharged from the compressor 110 is selectively introduced into the rear evaporator 210.

In order to directly supply the refrigerant discharged from the compressor 110 to the rear evaporator 210, the first refrigerant line 100 has a first flow control valve 170 installed therein and the second refrigerant line 200 has a second flow control valve 230 installed therein.

The first flow control valve 170 is a component configured to control flow of the refrigerant discharged from the compressor 110. The first flow control valve 170 is disposed downstream of the compressor 110 and upstream of the internal condenser 120 on the first refrigerant line 100 and is connected upstream of the rear evaporator 210 and downstream of the second expansion valve 220 via a third refrigerant line 180.

The first flow control valve 170 allows the refrigerant discharged from the compressor 110 to flow upstream of the rear evaporator 210 or to flow upstream of the internal condenser 120 and the external condenser 130. The first flow control valve 170 may be implemented as an electromagnetic three-way valve controlled by a controller 500.

The second flow control valve 230 is a component configured to control flow of the refrigerant discharged from the rear evaporator 210. The second flow control valve 230 is disposed downstream of the rear evaporator 210 on the second refrigerant line 200 and is connected upstream of the internal condenser 120 and the external condenser 130 and downstream of the compressor 110 via a fourth refrigerant line 240.

The second flow control valve 230 allows the refrigerant discharged from the rear evaporator 210 to flow upstream of the internal condenser 120 and the external condenser 130 or upstream of the accumulator 160 and the compressor 110. The second flow control valve 230 may be implemented as an electromagnetic three-way valve controlled by the controller 500.

The rear air conditioner 400 includes the rear evaporator 210, and the rear evaporator 210 has a passage for the flow of refrigerant. Reference numeral 410 denotes a PTC heater 410 provided on the rear air conditioner 400.

The first expansion valve 140 and the second expansion valve 220 are each implemented as an electromagnetic expansion valve controlled by the controller 500. The first expansion valve 140 and the second expansion valve 220 are controlled in a closed mode in which the flow of refrigerant is blocked or an open mode in which the flow of refrigerant is allowed.

The controller 500 controls the overall thermal management system of embodiments of the present invention having the structure described above. The controller 500 performs overall control of the electromagnetic components and the electric components included in the thermal management system. Specifically, the controller 500 controls operations of the first flow control valve 170, the second flow control valve 230, the electric compressor 110, the first expansion valve 140, the second expansion valve 220, etc.

In addition, in this specification, the external condenser 130 may be referred to as a first condenser, and the internal condenser 120 may be referred to as a second condenser.

Figure 2:
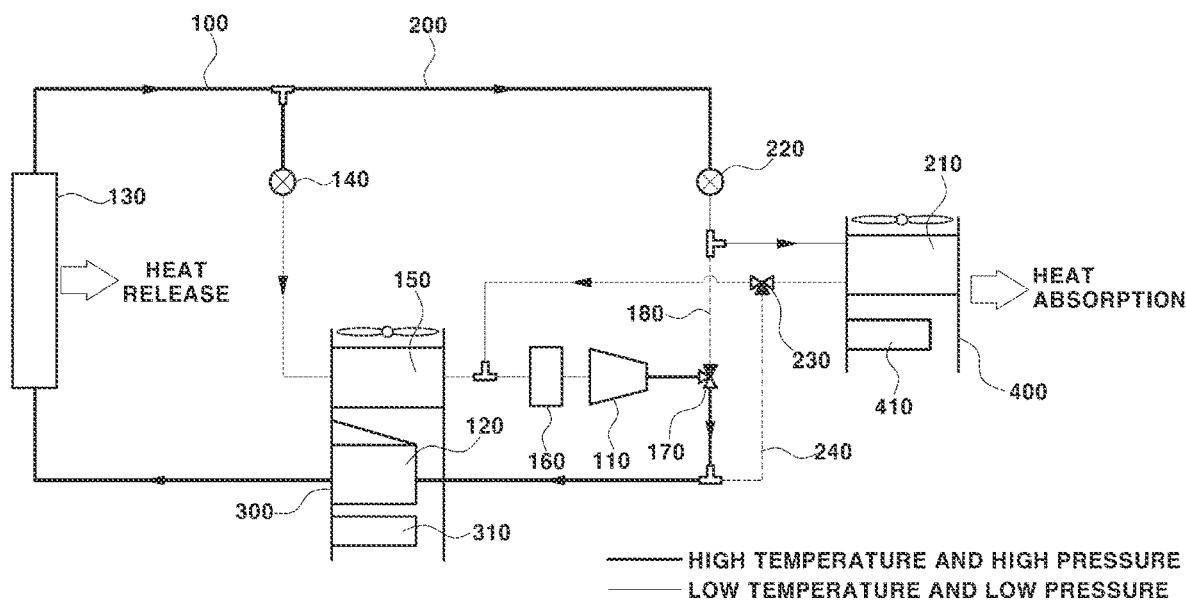
FIG. 2 is a view illustrating the flow of a refrigerant when a front evaporator and a rear evaporator of a thermal management system according to an embodiment of the present invention are operated in a cooling mode.
Figure 3:
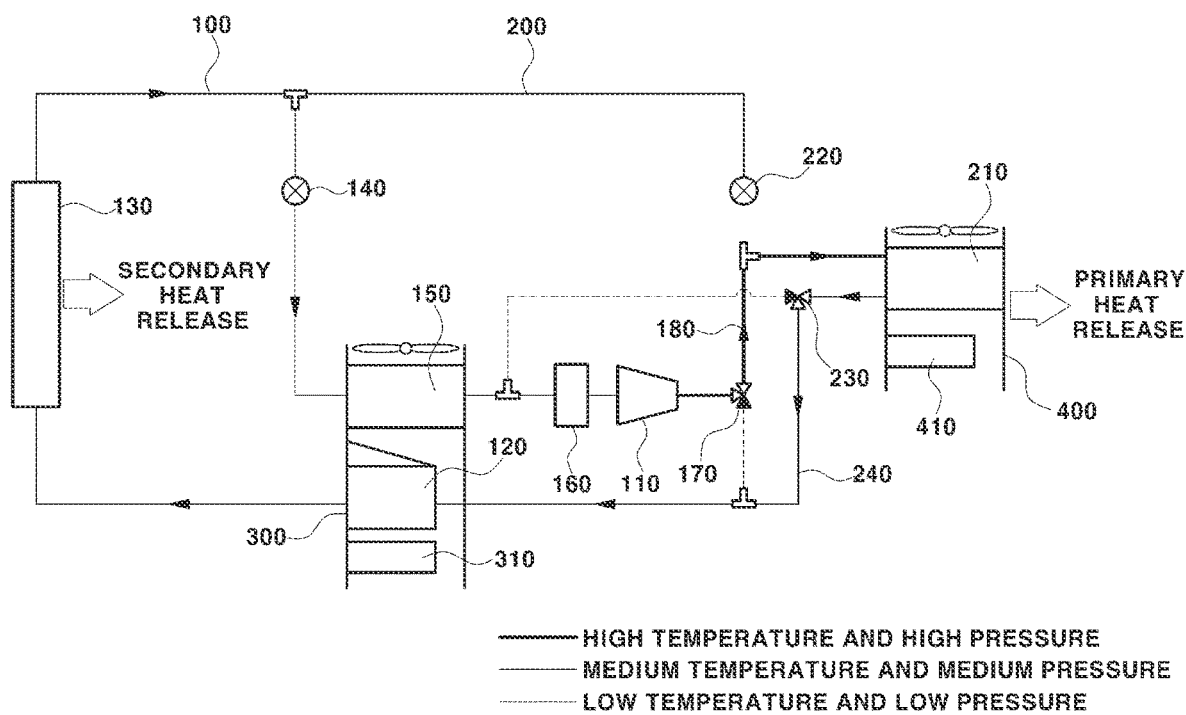
FIG. 3 is a view illustrating the flow of a refrigerant when a front evaporator of a thermal management system according to an embodiment of the present invention is solely operated in a cooling mode.

The arrows in FIGS. 2 and 3 indicate the flow direction of the refrigerant. The thickness of the circuit line in FIGS. 2 and 3 is shown to be different depending on the change in temperature and pressure of the refrigerant.

FIG. 2 illustrates the flow of refrigerant and changes in temperature and pressure of the refrigerant when both the front air conditioner 300 and the rear air conditioner 400 are operated in the cooling mode. Here, the first flow control valve 170 connects the compressor 110 to the internal condenser 120 and to the external condenser 130 so that refrigerant may flow therethrough but does not connect the compressor 110 to the rear evaporator 210. More specifically, the first flow control valve 170 closes a passage that connects the outlet of the compressor 110 to the inlet of the rear evaporator 210 (i.e., the third refrigerant line 180) while opening a passage that connects the outlet of the compressor 110 to the inlet of the internal condenser 120 (i.e., a section downstream of the compressor 110 on the first refrigerant line 100). Accordingly, the first flow control valve 170 blocks direct refrigerant flow from the compressor 110 to the rear evaporator 210 and allows direct refrigerant flow from the compressor 110 to the internal condenser 120.

In addition, the second flow control valve 230 connects the rear evaporator 210 to the compressor 110 so that the refrigerant may flow therethrough but does not connect the rear evaporator 210 to the internal condenser 120 or to the external condenser 130. More specifically, the second flow control valve 230 closes a passage that directly connects the outlet of the rear evaporator 210 to the inlet of the internal condenser 120 (i.e., the fourth refrigerant line 240) while opening a passage that directly connects the outlet of the rear evaporator 210 to the inlet of the compressor 110 (i.e., a section downstream of the rear evaporator 210 on the second refrigerant line 200). Accordingly, the second flow control valve 230 blocks direct refrigerant flow from the rear evaporator 210 to the internal condenser 120 and to the external condenser 130 and allows direct refrigerant flow from the rear evaporator 210 to the compressor 110. Here, the refrigerant discharged from the rear evaporator 210 passes through the accumulator 160 and then is introduced into the compressor 110. In addition, the first expansion valve 140 and the second expansion valve 220 are controlled in the open mode by the controller 500.

Because the flow control valves 170 and 230 and the expansion valves 140 and 220 are controlled as described above, the high-temperature and high-pressure gaseous refrigerant discharged from the compressor 110 is introduced into the external condenser 130 through the first refrigerant line 100 and the first flow control valve 170 and releases heat in the external condenser 130 to thereby be converted into a high-temperature and high-pressure liquid refrigerant. The high-temperature and high-pressure liquid refrigerant discharged from the external condenser 130 is reduced in pressure and expanded in volume by the first expansion valve 140 and then is converted into a low-temperature and low-pressure state. The low-temperature and low-pressure liquid refrigerant discharged from the first expansion valve 140 is introduced into the front evaporator 150 and absorbs heat in the front evaporator 150 to thereby be converted into a low-temperature and low-pressure gaseous refrigerant and then is introduced into the compressor 110 through the accumulator 160.

In addition, the high-temperature and high-pressure liquid refrigerant discharged from the external condenser 130 is reduced in pressure and expanded in volume by the second expansion valve 220. The low-temperature and low-pressure liquid refrigerant discharged from the second expansion valve 220 is evaporated in the rear evaporator 210. The low-temperature and low-pressure gaseous refrigerant discharged from the rear evaporator 210 is introduced into the accumulator 160 through the second refrigerant line 200 and the second flow control valve 230 and then is introduced into the compressor 110 through the accumulator 160.

The front evaporator 150 and the rear evaporator 210 evaporate the refrigerant through heat exchange with air. Here, air cooled by heat exchange with the refrigerant in the front evaporator 150 is supplied to the front seat space in the vehicle, and air cooled by heat exchange with the refrigerant in the rear evaporator 210 is supplied to the rear seat space in the vehicle.

FIG. 3 illustrates the flow of refrigerant and changes in temperature and pressure of the refrigerant when the front air conditioner 300 is operated in the cooling mode and the rear air conditioner 400 is not operated in the cooling mode. Here the first flow control valve 170 connects the compressor 110 to the rear evaporator 210 so that the refrigerant may flow therethrough but does not directly connect the compressor 110 to the internal condenser 120 or to the external condenser 130. More specifically, the first flow control valve 170 closes a passage that connects the outlet of the compressor 110 to the inlet of the internal condenser 120 (i.e., a section downstream of the compressor 110 on the first refrigerant line 100) while opening a passage that connects the outlet of the compressor 110 to the inlet of the rear evaporator 210 (i.e., the third refrigerant line 180). Accordingly, the first flow control valve 170 blocks direct refrigerant flow from the compressor 110 to the internal condenser 120 and to the external condenser 130 and allows direct refrigerant flow from the compressor 110 to the rear evaporator 210.

In addition, the second flow control valve 230 connects the rear evaporator 210 to the internal condenser 120 and to the external condenser 130 so that the refrigerant may flow therethrough but does not directly connect the rear evaporator 210 to the accumulator 160 or to the compressor 110. More specifically, the second flow control valve 230 closes a passage that connects the outlet of the rear evaporator 210 to the inlet of the compressor 110 (i.e., a section downstream of the rear evaporator 210 on the second refrigerant line 200) while opening a passage that connects the outlet of the rear evaporator 210 to the inlet of the internal condenser 120 (i.e., the fourth refrigerant line 240). Accordingly, the second flow control valve 230 blocks refrigerant flow from the outlet of the rear evaporator 210 to the inlet of the compressor 110 and allows refrigerant flow from the outlet of the rear evaporator 210 to the inlet of the internal condenser 120. Here, the first expansion valve 140 is controlled in the open mode, and the second expansion valve 220 is controlled in the closed mode.

Because the flow control valves 170 and 230 and the expansion valves 140 and 220 are controlled as described above, the high-temperature and high-pressure gaseous refrigerant discharged from the compressor 110 is introduced into the rear evaporator 210 through the first flow control valve 170 and the third refrigerant line 180 and releases heat primarily through heat exchange with air in the rear evaporator 210. The medium-temperature and high pressure gaseous refrigerant discharged from the rear evaporator 210 is introduced into the internal condenser 120 through the second flow control valve 230 and the fourth refrigerant line 240. Here, the refrigerant passes through the internal condenser 120 without changing the state thereof then is introduced into the external condenser 130 and releases heat secondarily in the external condenser 130. The medium-temperature and high-pressure liquid refrigerant discharged from the external condenser 130 is reduced in pressure and expanded in volume by the first expansion valve 140. The low-temperature and low-pressure liquid refrigerant discharged from the first expansion valve 140 is introduced into the front evaporator 150 and absorbs heat in the front evaporator 150 to thereby be converted into a low-temperature and low-pressure gaseous refrigerant and then is introduced into the compressor 110 through the accumulator 160.

Here, the liquid refrigerant introduced into the front evaporator 150 is evaporated through heat exchange with air, and the air cooled by heat exchange with the liquid refrigerant is supplied to the front seat space in the vehicle. In addition, the air heated through heat exchange with the refrigerant in the rear evaporator 210 is not supplied to the rear seat space in the vehicle.

As such, because the refrigerant discharged from the compressor 110 primarily releases heat in the rear evaporator 210 and secondarily releases heat in the external condenser 130, the refrigerant introduced into the front evaporator 150 is subcooled. More specifically, because the rear evaporator 210 is used as a condenser when the rear air conditioner 400 is not operated in the cooling mode, the load of the external condenser 130 is reduced. As the load of the external condenser 130 is reduced, the refrigerant pressure in the entire system is reduced, and eventually, the load of the compressor 110 is reduced. As a result, the power consumed by the compressor 110 is reduced, thereby increasing fuel efficiency and range of the vehicle.

As is apparent from the above description, embodiments of the present invention may provide the following effect.

According to embodiments of the present invention, the rear evaporator is used as a condenser to additionally release the refrigerant heat when the rear air conditioner is not operated in the cooling mode, thereby reducing the load of the external condenser and thus increasing fuel efficiency and range of the vehicle.

The effects obtained by embodiments of the present invention are not limited to the effect mentioned above, and other effects not mentioned herein will be clearly understood by those skilled in the art based on the above description.

Embodiments of the present invention have been described above in detail. Terms or words used in this specification and claims described below should not be construed as being limited to conventional or dictionary meanings. In addition, the scope of embodiments of the present invention is not limited to the above-described embodiments, and various modifications and improvements by those skilled in the art using the basic concept of embodiments of the present invention as defined in the claims below will also be included in the scope of embodiments of the present invention.

What is claimed is:

1. A thermal management system for a vehicle, the system comprising:
    a compressor provided on a first refrigerant line and configured to compress a refrigerant circulated in the first refrigerant line;
    an external condenser provided on the first refrigerant line, connected downstream of the compressor, and configured to release heat of the refrigerant discharged from the compressor through heat exchange with air;
    a front evaporator provided on the first refrigerant line, connected downstream of the external condenser, and configured to evaporate the refrigerant through heat exchange with the air;
    a second refrigerant line connected to the first refrigerant line and configured to allow the refrigerant discharged from the external condenser to be introduced thereinto and then to be discharged upstream of the compressor;
    a rear evaporator provided on the second refrigerant line and configured to selectively release heat of the refrigerant through heat exchange with the air;
    a first flow control valve provided on the first refrigerant line and configured to allow the refrigerant discharged from the compressor to be introduced into the rear evaporator or the external condenser; and
    a second flow control valve provided on the second refrigerant line and configured to allow the refrigerant discharged from the rear evaporator to be introduced into the compressor or the external condenser.

2. The system according to claim 1, wherein the first flow control valve is disposed downstream of the compressor and is connected upstream of the rear evaporator via a third refrigerant line.

3. The system according to claim 2, wherein the second flow control valve is disposed downstream of the rear evaporator and is connected upstream of the external condenser via a fourth refrigerant line.

4. The system according to claim 3, wherein, in a state in which the first flow control valve opens the third refrigerant line, the second flow control valve opens the fourth refrigerant line.

5. The system according to claim 4, wherein, in a state in which the second flow control valve opens the fourth refrigerant line, the refrigerant discharged from the rear evaporator is introduced into the external condenser via the fourth refrigerant line.

6. The system according to claim 4, wherein, in a state in which the second flow control valve opens the fourth refrigerant line, flow of the refrigerant from the rear evaporator to the compressor is blocked.

7. The system according to claim 3, wherein, in a state in which the first flow control valve closes the third refrigerant line, the second flow control valve closes the fourth refrigerant line.

8. The system according to claim 3, wherein, in a state in which the second flow control valve closes the fourth refrigerant line, the refrigerant discharged from the rear evaporator is introduced into the compressor via the second refrigerant line.

9. The system according to claim 2, wherein, in a state in which the first flow control valve opens the third refrigerant line, flow of the refrigerant from the compressor to the external condenser is blocked.

10. The system according to claim 2, wherein, in a state in which the first flow control valve opens the third refrigerant line, the refrigerant discharged from the compressor is introduced into the rear evaporator via the third refrigerant line.

11. The system according to claim 10, wherein, in a state in which the refrigerant discharged from the compressor is introduced into the rear evaporator via the third refrigerant line, the rear evaporator is configured to release heat of the refrigerant through heat exchange with the air.

12. The system according to claim 2, wherein, in a state in which the first flow control valve closes the third refrigerant line, the refrigerant discharged from the compressor is introduced into the external condenser via the first refrigerant line.

13. The system according to claim 2, wherein the second refrigerant line is provided with an expansion valve disposed upstream of the rear evaporator.

14. The system according to claim 13, wherein, in a state in which the first flow control valve opens the third refrigerant line, the expansion valve is controlled in a closed mode.

15. The system according to claim 13, wherein, in a state in which the first flow control valve closes the third refrigerant line, the expansion valve is controlled in an open mode.

16. The system according to claim 15, wherein, in a state in which the expansion valve is controlled in the open mode and the refrigerant from which heat is released in the external condenser is introduced into the rear evaporator, the rear evaporator is configured to evaporate the refrigerant through heat exchange with the air.

\* \* \* \* \*